US010129834B2

(12) United States Patent
Yao et al.

(10) Patent No.: US 10,129,834 B2
(45) Date of Patent: Nov. 13, 2018

(54) TRANSMISSION POWER CONTROL METHODS AND DEVICES

(71) Applicant: Intel Corporation, Santa Clara, CA (US)

(72) Inventors: Zhen Yao, San Jose, CA (US); Suraj Sindia, Hillsboro, OR (US); Songnan Yang, San Jose, CA (US); John M. Roman, Hillsboro, OR (US); Robert Paxman, Hillsboro, OR (US); Bernhard Raaf, Neuried (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/476,061

(22) Filed: Mar. 31, 2017

(65) Prior Publication Data

US 2018/0288709 A1    Oct. 4, 2018

(51) Int. Cl.
   *H04W 52/18* (2009.01)
(52) U.S. Cl.
   CPC ........ *H04W 52/18* (2013.01); *H04M 2250/12* (2013.01)
(58) Field of Classification Search
   USPC .............................................. 455/522, 69–70
   See application file for complete search history.

(56) References Cited

U.S. PATENT DOCUMENTS

| 2007/0111681 | A1 | 5/2007 | Alberth et al. |
| 2012/0214422 | A1 | 8/2012 | Shi et al. |
| 2012/0250647 | A1 | 10/2012 | Das et al. |
| 2014/0376430 | A1 | 12/2014 | Su et al. |
| 2015/0323472 | A1 | 11/2015 | Lee et al. |
| 2017/0064641 | A1* | 3/2017 | Logan .................... H04W 52/18 |
| 2017/0194996 | A1* | 7/2017 | Shi ........................ H04B 1/3838 |
| 2017/0332333 | A1* | 11/2017 | Santhanam ........... H04W 52/18 |

OTHER PUBLICATIONS

Chiang et al., "Power Control in Wireless Cellular Networks," Foundations and Trends in Networking, 2008, vol. 2. Retrieved on May 18, 2018 from the Internet at URL:<https://www.princeton.edu/-chiangm/powercontrol.pdf>.

Chan, "Overview of RF Exposure Concepts and Requirements," Federal Communications Commission, Office of Engineering and Technology, Laboratory Division, Oct. 2005. Retrieved on May 18, 2018 from the Internet at URL: https://www.researchgate.net/publication/279201172_Capacitive_proximity_sensing_in_smart_environments.

(Continued)

*Primary Examiner* — Fayyaz Alam
(74) *Attorney, Agent, or Firm* — Schiff Hardin LLP

(57) ABSTRACT

Transmission power control methods and devices are described. In a transmission power control method, a specific absorption rate (SAR) is calculated based on a transmission power of the communication device and a proximity distance of the communication device with an external object. A time average specific absorption rate can be calculated based on the SAR. A power absorption budget value can be calculated based on the time average specific absorption rate and a time average specific absorption rate threshold value. Further, the transmission power of the communication device can be adjusted based on the power absorption budget value.

25 Claims, 9 Drawing Sheets

(56) References Cited

OTHER PUBLICATIONS

Braun et al., "Capacitive proximity sensing in smart environments," Fraunhofer Institute for Computer Graphics Research IGD and Technische Universit?t Darmstadt, Germany, Jun. 30, 2015. Retrieved on May 18, 2018 from the Internet at URL: https://www.researchgate.net/publication/279201172_Capacitive_proximity_sensing_in_smart_environments.
"Ultra Low Power, Dual Channel Smart Proximity SAR Compliant Solution," Semtech Technical Bulletin, Feb. 5, 2014. Retrieved on May 18, 2018 from the Internet at URL: https://www.semtech.com/uploads/documents/sx9300.pdf.
"Ensuring Radio Equipment Safety in Canada," Government of Canada, Certification and Engineering Bureau, Nov. 29, 2016. Retrieved on May 18, 2018 from the Internet at URL: https://www.ic.gc.ca/eic/site/ceb-bhst.nsf/eng/h_tt00084.html.
Search Report dated Jul. 5, 2018 for Intenational Application No. PCT/US18/13856.

\* cited by examiner

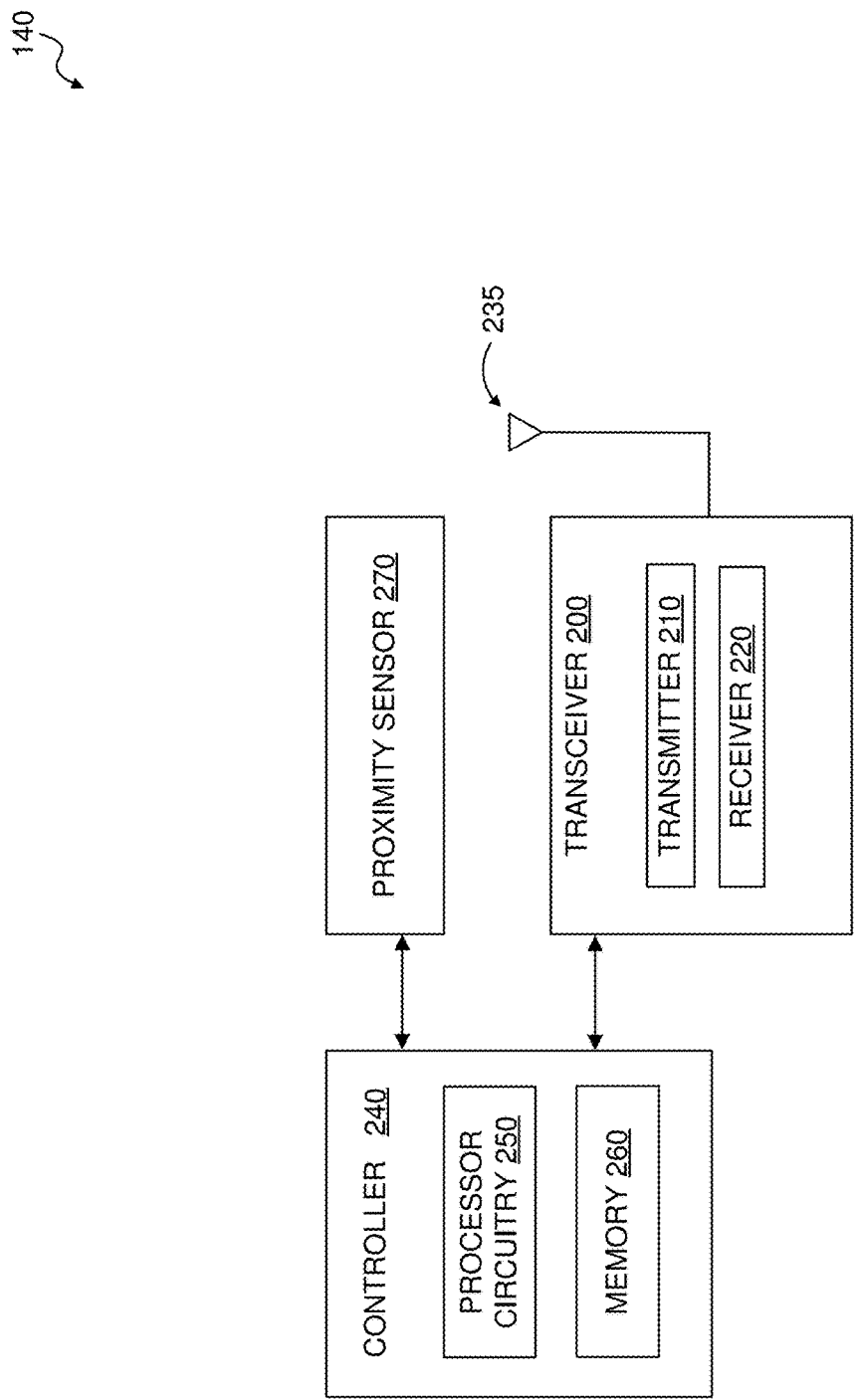

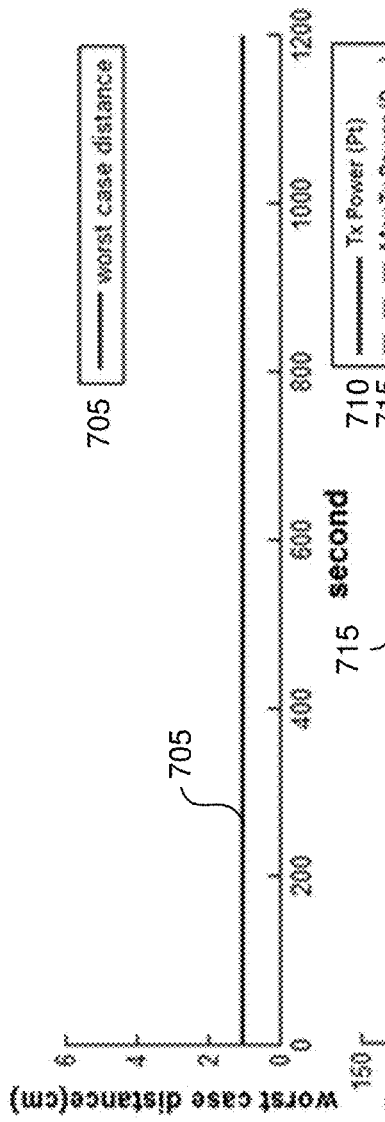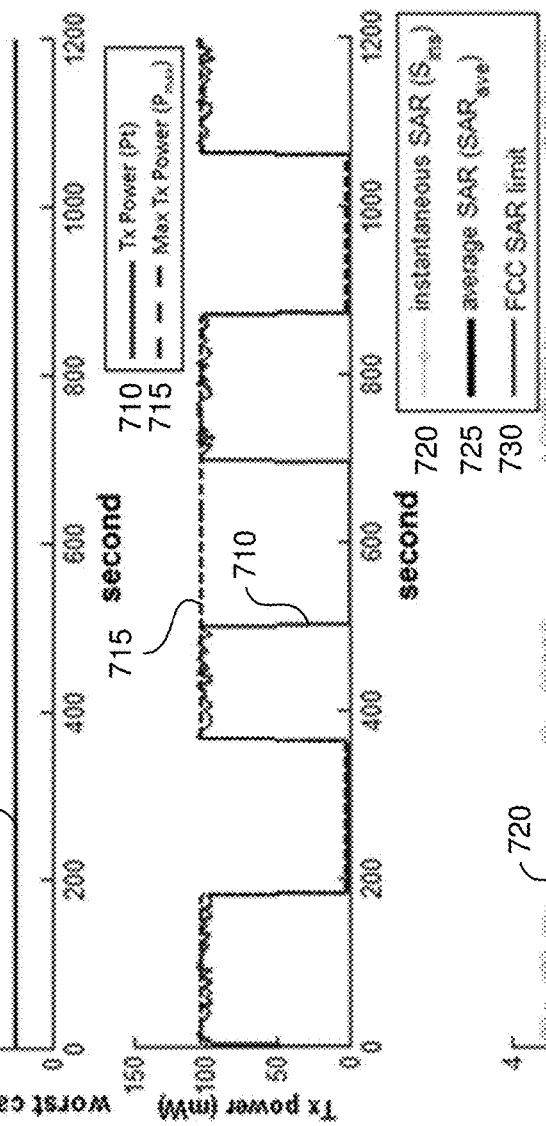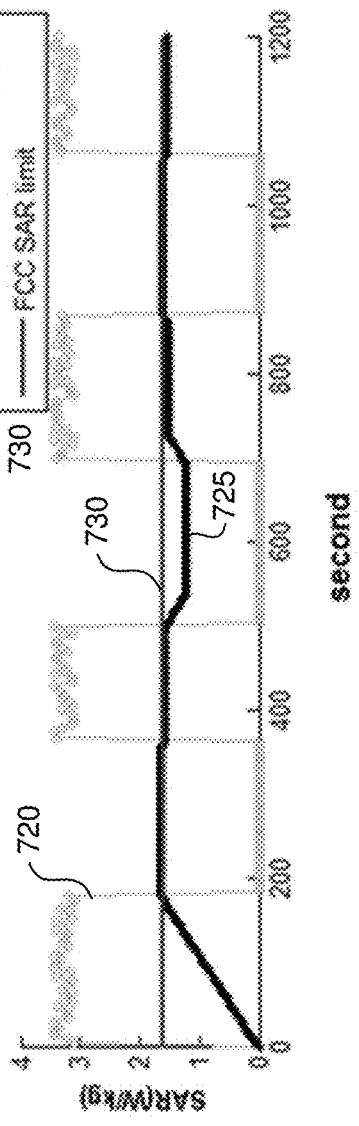

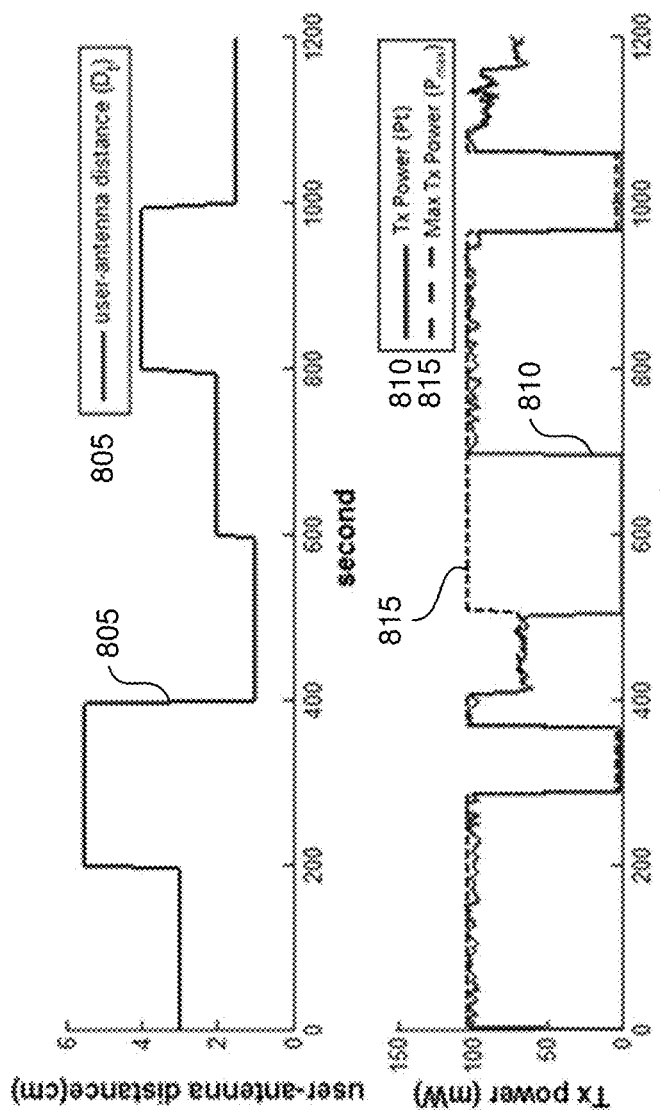
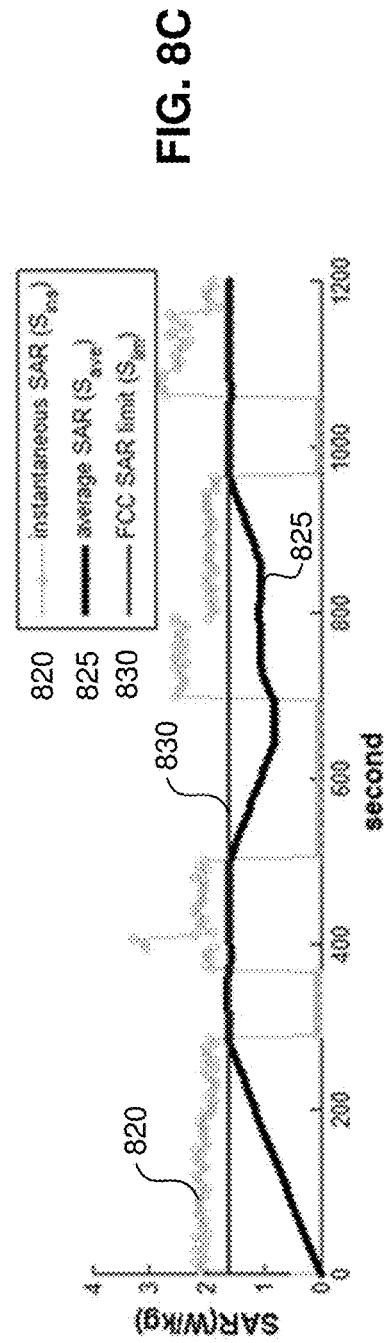
FIG. 8A
FIG. 8B
FIG. 8C

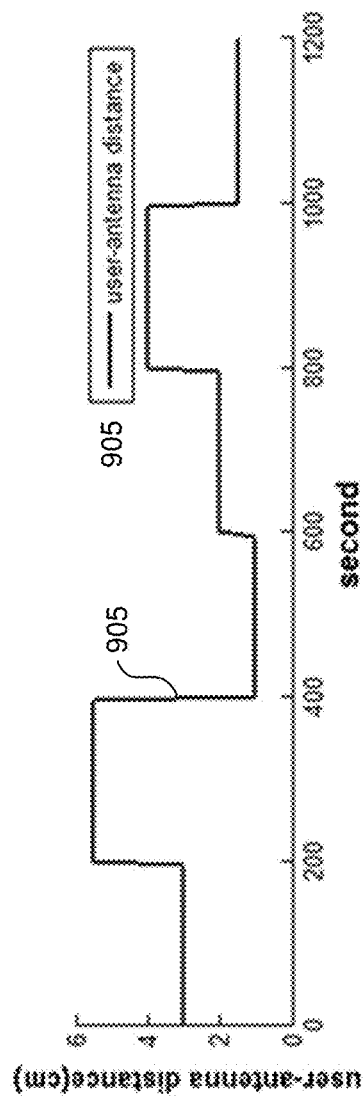
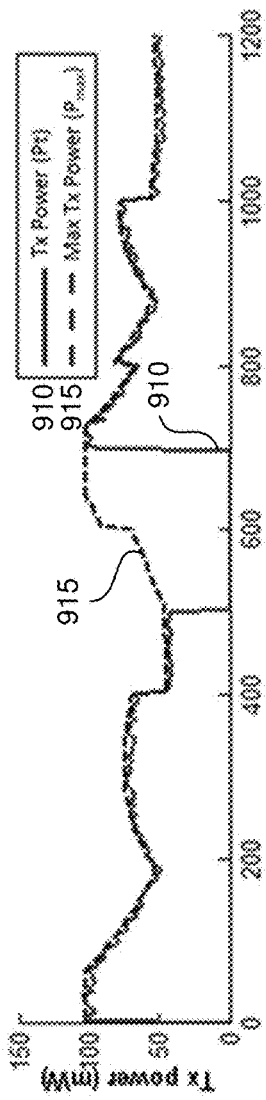
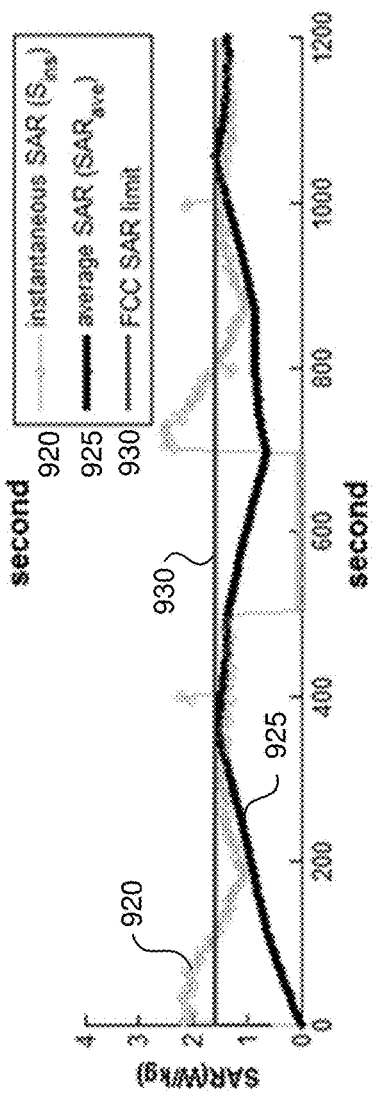
FIG. 9A
FIG. 9B
FIG. 9C

TRANSMISSION POWER CONTROL METHODS AND DEVICES

BACKGROUND

Field

Aspects described herein generally relate to transmission power control for wireless communications, including controlling transmission power based on the proximity of a wireless communication device to an object such as a user.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

FIG. 2 illustrates a mobile device according to an exemplary aspect of the present disclosure.

FIGS. 7A-7C illustrate plots of a time average SAR based on a transmit power and a constant proximity distance according to an exemplary aspect of the present disclosure.

FIGS. 8A-8C illustrate plots of a time average SAR based on a transmit power and a proximity distance according to an exemplary aspect of the present disclosure.

FIGS. 9A-9C illustrate plots of a time average SAR based on a transmit power and a proximity distance according to an exemplary aspect of the present disclosure.

The exemplary aspects of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Figure 1:
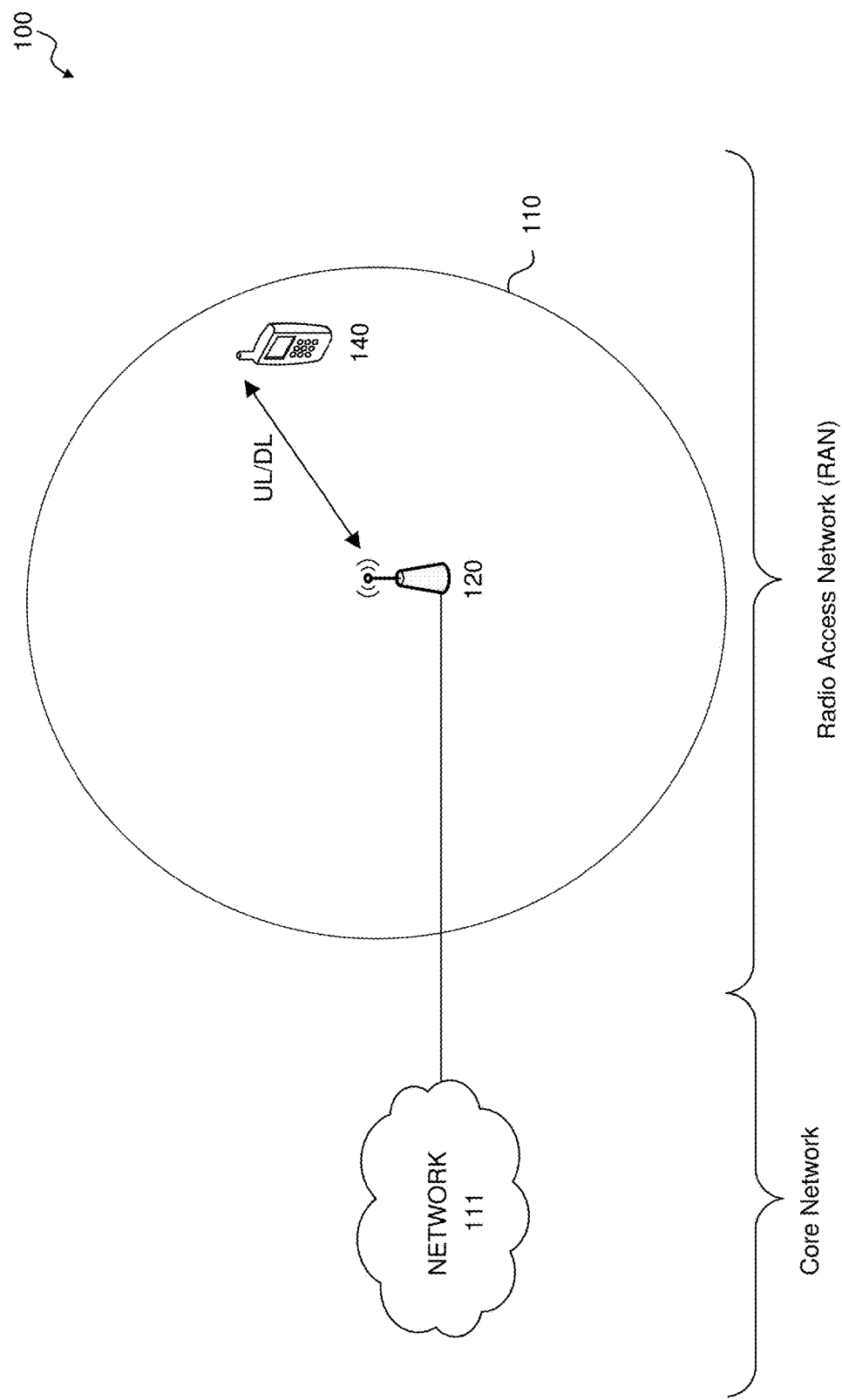
FIG. 1 illustrates an example network environment.

FIG. 1 illustrates an example communication environment 100 that includes a radio access network (RAN) and a core network. The RAN includes one or more base stations 120 and one or more communication devices 140. The core network includes a backhaul communication network 111. In an exemplary aspect, the backhaul communication network 111 can include one or more well-known communication components—such as one or more network switches, one or more network gateways, and/or one or more servers. The backhaul communication network 111 can include one or more devices and/or components configured to exchange data with one or more other devices and/or components via one or more wired and/or wireless communications protocols. In exemplary aspects, the base stations 120 communicate with one or more service providers and/or one or more other base stations 120 via the backhaul communication network 111. In an exemplary aspect, the backhaul communication network is an internet protocol (IP) backhaul network.

The number of base stations 120, communication devices 140, and/or networks 111 are not limited to the exemplary quantities illustrated in FIG. 1, and the communication environment 100 can include any number of the various components as would be understood by one of ordinary skill in the relevant art(s). In an exemplary aspect, the base station 120 and/or communication device 140 include processor circuitry that is configured to communicate via one or more wireless technologies.

The communication device 140 and the base station 120 can each include a transceiver configured to transmit and/or receive wireless communications via one or more wireless technologies within the communication environment 100. In operation, the communication device 140 can be configured to communicate with the base station 120 in a serving cell or sector 110 of the communication environment 100. For example, the communication device 140 receives signals on one or more downlink (DL) channels from the base station 120, and transmits signals to the base station 120 on one or more respective uplink (UL) channels.

Examples of the communication device 140 include (but are not limited to) a mobile device—such as a laptop computer, a tablet computer, a mobile telephone or smartphone, a "phablet," a personal digital assistant (PDA), and mobile media player; and a wearable computing device—such as a computerized wrist watch or "smart" watch, and computerized eyeglasses. In some aspects of the present disclosure, the communication device 140 may be a stationary communication device, including, for example, a base station, an access point, or a stationary computing device—such as a personal computer (PC), a desktop computer, a computerized kiosk, and an automotive/aeronautical/maritime in-dash computer terminal.

As an overview, a specific absorption rate (SAR) is standardized quantity (with unit W/Kg) for measuring absorption of radio frequency (RF) power to human tissue. With radio devices, such as wireless communication devices, SAR limits have been established by various regulatory agencies, including the Federal Communication Commission (FCC), European Telecommunications Standards Institute (ETSI), and International Commission on Non-Ionizing Radiation Protection (ICNIRP). To comply with these SAR limits, wireless communication devices can adjust the transmission power of their wireless communications. In exemplary aspects described below, a communication device (e.g., a mobile device) is configured to adjust a transmission power of its wireless (e.g., RF) communications based on an average of the SAR over a period time.

The SAR average can be, for example, a time moving average. The SAR average can be calculated based on, for example, instantaneous RF output power information and proximity information, which indicates the proximity of one or more objects (e.g., the user of the mobile device) to the communication device (e.g., transmission antenna).

Figure 3A:
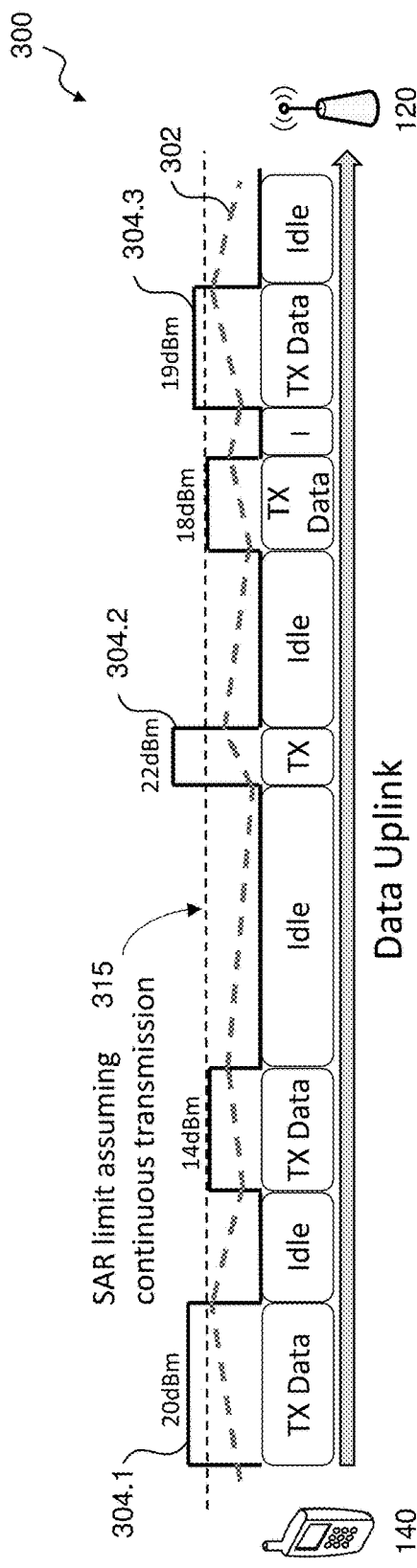
FIG. 3A illustrates a transmit control operation based on a running average SAR value according to exemplary aspects of the present disclosure.
Figure 3B:
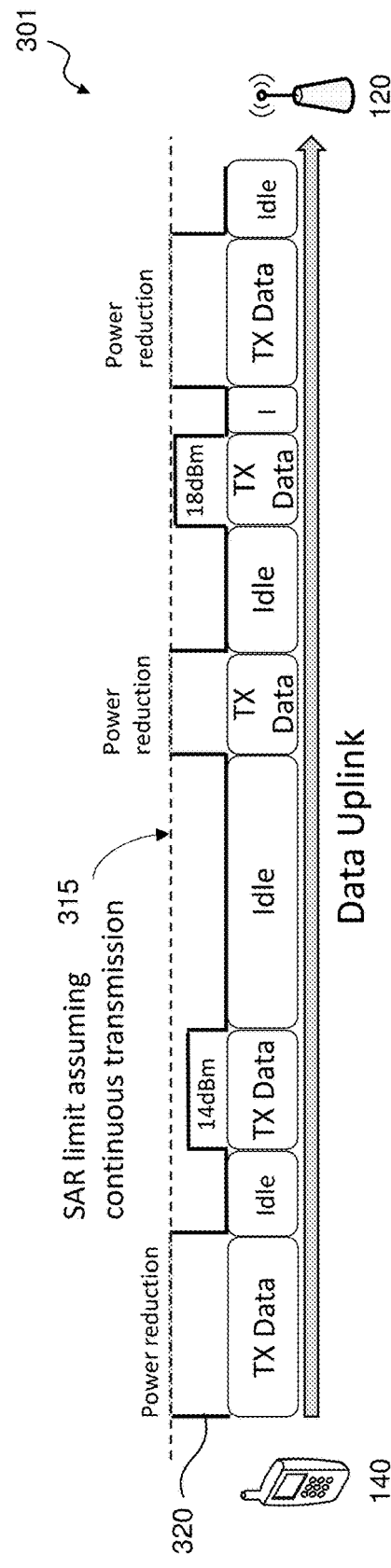
FIG. 3B illustrates a transmit control operation based on an instantaneous SAR value according to exemplary aspects of the present disclosure.

In aspects of the disclosure, SAR regulatory compliance testing and calibration can be performed and be based on a worst case instantaneous SAR measurement as shown with reference to FIG. 3B. In this example, a test procedure can assume the communication device under test (DUT) is continuously transmitting at a maximum power of the communication device under the test. For example, the testing can determine the maximum transmission power at which the DUT can continuously transmit over a predetermined period of time (e.g., 6 minutes) while complying with a SAR maximum threshold value (e.g., 315) determined by, for example, one or more regulatory agencies. This determined transmission power can then be set as the DUT's maximum transmission power (e.g., 320).

For example, to comply with SAR regulatory limits or thresholds, the communication device (e.g., communication device 140) can be configured to reduce and/or limit the maximum transmission power to be less than or equal to the SAR limit 315 (e.g., without concern as to the proximity of the communication device to the user). Alternatively, the communication device can be configured to dynamically adjust the transmission power of the communication device based on, for example, the proximity of the communication device to the user of the communication device. For example, the communication device can include one or more proximity sensors that are configured to determine the proximity of the communication device to the user. In this example, the communication device can be configured to reduce the transmission power to, for example, the SAR limit 315 based on the proximity of the communication device 140 to the user. In operation, the communication device can be configured to adjust the modulation and coding scheme (MCS), such as to lower the MCS, to reduce the transmission power so as to comply with the SAR limit 315. For example, when proximity to the user, the communication device adjust the transmission power so as to comply with the SAR limit 315 and to allow for an increased transmission power when the communication device is not proximity (or as close) to the user.

In an exemplary aspect, the communication device can be configured to calculate an average (e.g., time moving/running average) of the transmission (TX) power over time 302 as shown in FIG. 3A, and adjust the instantaneous TX power (e.g., peak TX power 304) based on the average TX power 302 so as to comply with the SAR limit 315 (e.g., to be less than or equal to the SAR limit 315). As shown in FIG. 3A, the average TX power 302 is less than the peak TX power 304 during transmission (TX) periods (e.g., during the TX data states) due to a discontinuous transmission operation. The communication device can operate at a TX power (e.g., at 304.1, 304.2, 304.3) that exceeds the SAR limit 315 due to the average TX power 302 maintaining a value that is less than the SAR limit 315. Advantageously, the communication device can, for example: utilize modulation and encoding schemes without compromise, reduce transmission times, increase network performance (e.g., capacity, range), and/or reduce the user's average SAR exposure due to retries/reconnects, which may be prevalent in configurations that use a dynamically adjusted transmission power mechanism (e.g., FIG. 3B).

In an exemplary aspect, as shown in FIG. 3A, the transmit power is controlled such that the time domain running average SAR value (e.g., 302) is equal to or less than a transmission power threshold value (e.g., 315) (e.g., a regulatory compliance limit). In this example, the communication device can allow for instantaneous transmit power levels to exceed the transmission power threshold value (e.g., 315) so as long as the average SAR value (e.g., 302) is equal to or less than the transmission power threshold value (e.g., 315). In some aspects, the instantaneous transmit power levels can exceed the transmission power threshold value even with the user of the communication device being in close proximity to the communication device so as long as the average SAR value (e.g., 302) is equal to or less than the transmission power threshold value (e.g., 315).

In an exemplary aspect, the communication device is configured to calculate a moving average of SAR based on instantaneous RF output power data and/or proximity between the communication device 140 (e.g., the antenna of the device) and a user's body. The calculated average SAR can be used to control future transmit power limits of the communication device 140. The communication device 140 can be configured to wireless communicate via one or more wireless communication protocols, including (but not limited to), for example, one or more 3G, 4G, 5G, and/or wireless local area networking (WLAN) communication protocols.

In an exemplary aspect, the communication device can be configured to monitor the real time transmit power of the communication device and dynamically set a maxim transmission power limit based on the monitoring. The communication device can include, for example, an RF front end that is configured to monitor and dynamically adjust the transmission power limit. In an exemplary aspect, the communication device can be configured to calculate a real time RF exposure level and a time domain running average of SAR for a sampling window size (e.g., at least 6 minute window).

The communication device can include one or more proximity sensor configured to detect a distance between the communication device and an object (e.g., a user of the device). The sensor can be configured to detect the distance between the object and the transmission antenna(s) of the communication device.

Figure 5:
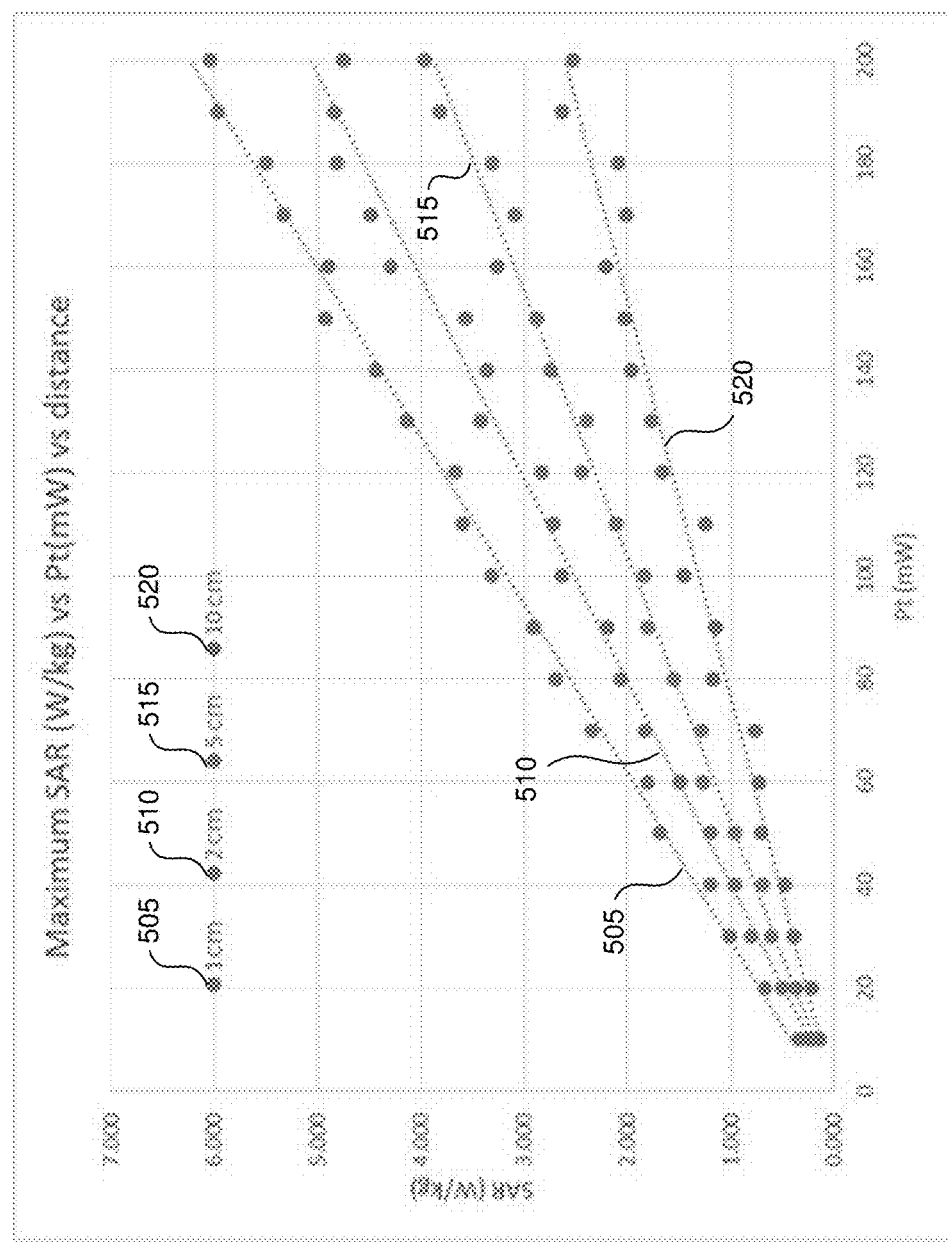
FIG. 5 illustrates an example relationship between SAR and the transmit power (Pt in mW) at various proximity distances accordingly to an exemplary aspect of the present disclosure.

In one or more aspects, relationships between the transmission power and the RF exposure level can be determine for one or more distances between the communication device and the user (or other object). For example, one or more RF exposure calibration operations can be performed to determine the relationship between TX power and RF exposure level at one or more separation distances. The information regarding the transmission power, distance, and RF exposure (e.g. SAR) can be stored in a memory and used for the calculation of one or more SAR levels. In an exemplary aspect, the transmission power, distance, and RF exposure (e.g. SAR) can be stored in one or more look-up tables. FIG. 5 illustrates the relationship between SAR and the transmit power (Pt in mW) at various proximity distances accordingly to an exemplary aspect of the present disclosure. As shown, the SAR values at 1 cm (505), 2 cm (510), 5 cm (515) and 10 cm (520) are shown for a range of transmit power values from 0-200 mW. These values and corresponding relationships can be determined through one or more calibration and procedures. These values can be stored in a memory (e.g. LUT) of, for example, the communication device, and/or in a memory accessible to the communication device (e.g., a memory in the base station, the cloud, etc.).

In an exemplary aspect, the communication device can be configured to adjust transmit power (e.g., by setting an upper transmission power limit) such that the averaged RF exposure (e.g., average SAR) is lower than or equal to one or more thresholds, such as one or more regulatory compliance limits (e.g., FCC SAR limit).

FIG. 2 illustrates the communication device 140 according to an exemplary aspect of the present disclosure. The communication device 140 can include controller 240 communicatively coupled to one or more transceivers 200 and one or more proximity sensors 270. The transceiver(s) can be configured to transmit and/or receive wireless communications via one or more wireless technologies within the communication environment 100. The proximity sensor(s) 270 can be configured to detect the proximity of one or more objects to the communication device 140. For example, the proximity sensor 270 can detect the distance the communication device 140 is to a user of the communication device 140.

The transceiver 200 can include processor circuitry that is configured for transmitting and/or receiving wireless communications conforming to one or more wireless protocols. For example, the transceiver 200 can include a transmitter 210 and a receiver 220 configured for transmitting and receiving wireless communications, respectively, via one or more antennas 235. The transceiver 200 can be configured to calculate or otherwise determine the current (e.g., instantaneous) transmit power ($P_t$) of the transceiver 200 is wireless transmitting at. The transceiver 200 can provide the determined transmit power ($P_t$) to the controller 240. The transceiver 200 can alternatively determine transmission information, such as, for example, wireless channel information, the radio access technology (RAT) being used, the modulation and coding scheme, and/or one or more other parameters as would be understood by those skilled in the art. The transmission information can then be provided to the controller 240, and the controller 240 can be configured to determine the transmit power ($P_t$) based on the transmission information.

In exemplary aspects, the transceiver 200 can include (but is not limited to) a digital signal processor (DSP), modulator and/or demodulator, a digital-to-analog converter (DAC) and/or an analog-to-digital converter (ADC), an encoder/decoder (e.g., encoders/decoders having convolution, tail-biting convolution, turbo, Viterbi, and/or Low Density Parity Check (LDPC) encoder/decoder functionality), a frequency converter (including mixers, local oscillators, and filters), Fast-Fourier Transform (FFT), precoder, and/or constellation mapper/de-mapper that can be utilized in transmitting and/or receiving of wireless communications. Further, those skilled in the relevant art(s) will recognize that antenna 235 may include an integer array of antennas, and that the antennas may be capable of both transmitting and receiving wireless communication signals.

The controller 240 can include processor circuitry 250 that is configured to control the overall operation of the communication device 140, such as the operation of the proximity sensor 270 and/or transceiver 200. The processor circuitry 250 can be configured to, for example: adjust one or more parameters of the proximity sensor 270; control the proximity sensor 270 to determine a distance to an object (e.g., user); control the transmitting and/or receiving of wireless communications via the transceiver 200, including controlling the transmit power of the communication device 140; and/or perform one or more baseband processing functions (e.g., radio frequency (RF) to baseband conversion, media access control (MAC), encoding/decoding, modulation/demodulation, data symbol mapping; error correction, etc.). The processor circuitry 250 can be configured to run one or more applications and/or operating systems; power management (e.g., battery control and monitoring); display settings; volume control; and/or user interactions via one or more user interfaces (e.g., keyboard, touchscreen display, microphone, speaker, etc.).

The controller 240 can further include a memory 260 that stores data and/or instructions, where when the instructions are executed by the processor circuitry 250, controls the processor circuitry 250 to perform the functions described herein. The memory 260 can store SAR calibration information. The memory 260 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 260 can be non-removable, removable, or a combination of both.

The proximity sensor 270 can include processor circuitry that is configured to detect the proximity of one or more objects to the communication device 140. For example, the processor circuitry of the proximity sensor 270 can be configured to detect the distance the communication device 140 is to an object (e.g., user of the communication device 140) and to generate proximity information corresponding to the detected distance. In an exemplary aspect, the proximity sensor 270 can be configured to calculate a proximity distance (e.g., $D_t$) that corresponds to the distance between the communication device 140 and one or more objects (e.g., the user of the communication device 140). In other aspects, the controller 240 can calculate the proximity distance (e.g., $D_t$) based on proximity information provided to the controller 240 by the proximity sensor 270.

The proximity sensor 270 can also be configured to operate in a reduced (e.g., low) power operating mode when not being used by the communication device 140. In an exemplary aspect, when operating in the reduced power operating mode, the proximity sensor 270 or one or more components of the proximity sensor 270 can, for example, reduce its power consumption or power off. The proximity sensor 270 can be configured to enter and operate in the reduce power operating mode after being idle for a predetermined amount of time and/or in response to one or more control signals generated by the controller 240.

The proximity sensor 270 can be a capacitance proximity sensor configured to detect the proximity of one or more objects to the communication device 140 based on a detected capacitance, but is not limited thereto. For example, the proximity sensor 270 can be an infrared proximity sensor that measures an infrared value. In other aspects, the proximity sensor 270 can be configured to measure heat, light, sound, vibration, movement, acceleration, orientation of the device, inductance, resistance, and/or another environmental value as would be understood by one of ordinary skill in the art to measure the proximity of one or more objects.

In an exemplary aspect, the controller 240 can be configured to calculate or otherwise determine a current (e.g., instantaneous) SAR value (e.g., $S_{ins}$) based on the transmit power ($P_t$) of the transceiver 200 and/or on the proximity distance (e.g., $D_t$). In an exemplary aspect, the instantaneous SAR value (e.g., $S_{ins}$) can be determined from information obtained from one or more calibration or testing operations. For example, the controller 240 can access a memory (e.g., memory 260) that stores instantaneous SAR values (e.g., $S_{ins}$) having corresponding transmit power ($P_t$) and/or proximity distance (e.g., $D_t$) values. For example, the controller 240 can access a LUT and determine the instantaneous SAR value (e.g., $S_{ins}$) based on the transmit power ($P_t$) and/or proximity distance (e.g., $D_t$) values.

In an exemplary aspect, the controller 240 can be configured to calculate a time average specific absorption rate (e.g., average SAR) based on the instantaneous SAR value (e.g., $S_{ins}$) over a sampling window. In an exemplary aspect, the average SAR value ($S_{ave}$) is calculated over a regulation period T based on the following equation:

$$S_{ave} = \frac{1}{T}\int_{T_0-T}^{T_0} S_{ins} dt$$

where T is the regulation period, $T_o$ is the current point in time (e.g., the end of the sampling window), and $S_{ins}$ is the instantaneous SAR value.

In operation, the proximity of the communication device 140 to the absorbing object (e.g., the user of the mobile device) impacts the SAR of radio frequency (RF) power to the absorbing object. For example, a communication device that is closer to the object will have a higher instantaneous SAR than a communication device at a farther distance from the object when operating at the same transmission power. The SAR may additionally or alternatively depend on wireless communication parameters of the communication device 140, such as the wireless band at which the communication device 140 is operating, the wireless channel, the radio access technology (RAT) being used, the modulation and coding scheme, or one or more other parameters as would be understood by those skilled in the art.

In an exemplary aspect, the communication device 140 (e.g., controller 240) can monitor and adjust the transmission power at which the transceiver 200 wirelessly transmits (e.g., to comply with regulated SAR limits). The controller 240 can be configured to adjust the transmission power of the communication device 140 based on a specific absorption rate and/or the proximity of the communication device to one or more objects. In an exemplary aspect, the communication device 140 can be configured to adjust the transmission power of the communication device 140 based on a time average specific absorption rate (e.g., average SAR 302). The time average specific absorption rate can be a time domain moving average of the SAR (e.g., within a sampling window). The sampling window can have a predetermined or adjusting length (e.g., regulation period T). In an exemplary aspect, the sampling window is 6 minutes, but it not limited thereto can be other time periods as would be understood by one of ordinary skill in the relevant arts. The controller 240 can be configured to calculate the time average specific absorption rate (e.g., average SAR 302), and adjust (or control the communication device 140 to adjust) the transmission power of the communication device 140 based on the calculated time average SAR and/or the proximity of the communication device to one or more objects.

In an exemplary aspect, the controller 240 can be configured to calculate a transmission power threshold value $P_{max}$ and adjust the transmission power $P_t$ of the communication device 140 based on the transmission power threshold value $P_{max}$. By throttling the next transmit power $P_t$ to the transmission power threshold value $P_{max}$, the resulting instantaneous SAR value $S_{ins}$ is set such that the resulting average SAR value ($S_{ave}$) over the estimated transmission duty cycle of the communication device (i.e., the future transmission duty cycle factor (β)) is less than are equal to the time average specific absorption rate threshold value ($S_{lim}$). As a result, the average SAR value ($S_{ave}$) (e.g., 302 in FIG. 3) of the communication device 140 is maintained so as to comply with one or more regulatory thresholds while allowing for the transmit power of the communication to exceed a transmission power threshold value (e.g., 315 in FIG. 3).

Figure 4:
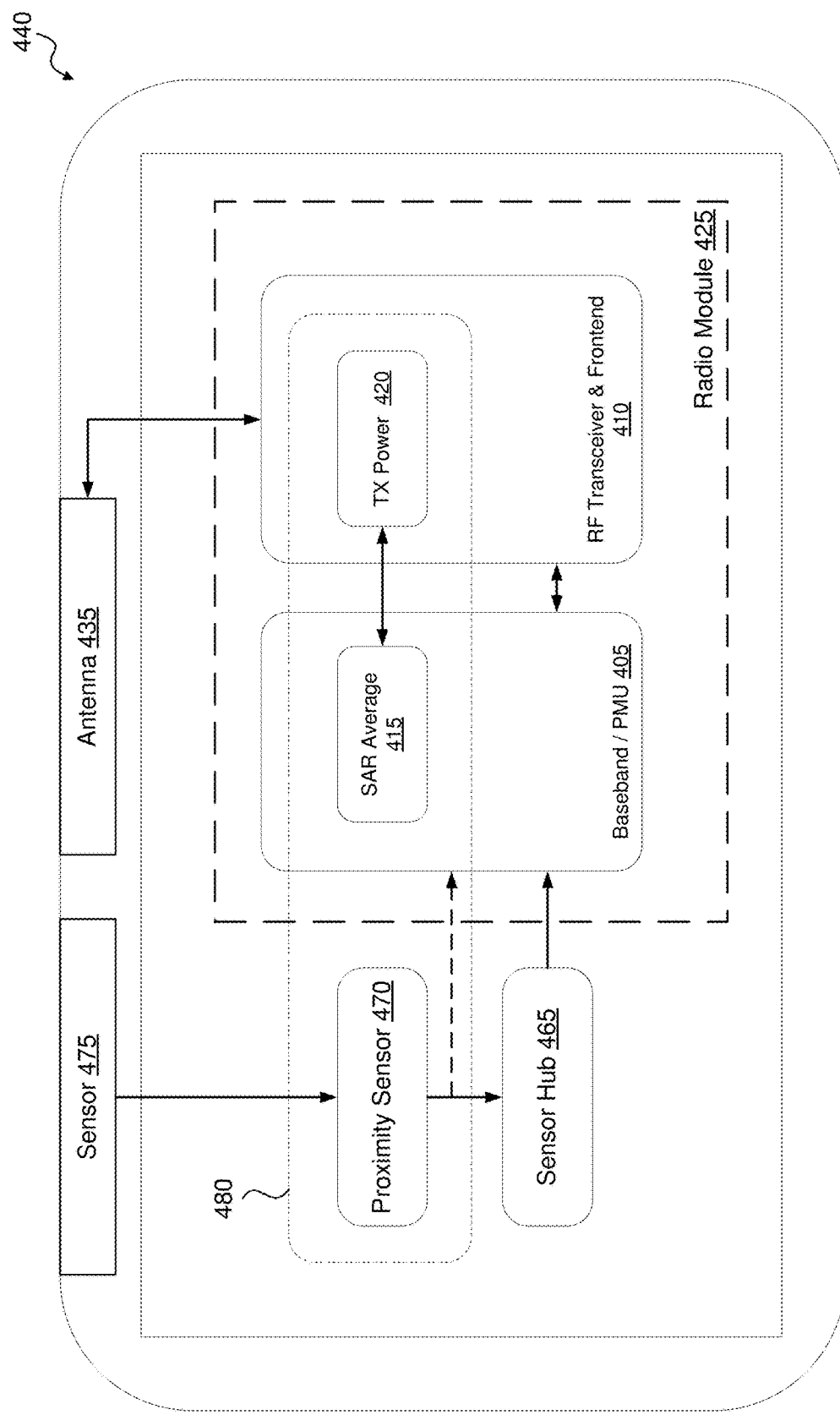
FIG. 4 illustrates a mobile device according to an exemplary aspect of the present disclosure.

FIG. 4 illustrates the communication device 440 according to an exemplary aspect of the present disclosure. The communication device 440 can be an exemplary aspect of the controller 140. The communication device 440 can include a radio 425 that includes a baseband processor 405 and a RF transceiver and frontend 410. The baseband processor 405 can be communicatively coupled to the RF transceiver and frontend 410, which is communicatively coupled to one or more antennas 435.

The communication device 400 can further include a proximity sensor 470 communicatively coupled to one or more sensor elements 475. The proximity sensor 470 can be communicatively coupled to the baseband processor 405 directly or indirectly. For example, the proximity sensor 470 can be communicatively coupled to the baseband processor 405 via a sensor hub 465. In an exemplary aspect, the baseband processor 405 can be an embodiment of the controller 240; the sensor element(s) 475, proximity sensor 470, and/or sensor hub 465 can be an embodiment of the proximity sensor 270; and/or the RF transceiver and frontend 410 can be an embodiment of the transceiver 200.

The sensor element 475 can be configured to detect the proximity of one or more objects to the communication device 440 and generate a proximity signal based on the detection. The sensor element 475 can be a capacitance sensor, but is not limited thereto. In this example, the sensor element can detect a capacitance value and generate the proximity signal that corresponding to the detected capacitance. The sensor element 475 can include processor circuitry that is configured to detect the proximity of one or more objects to the communication device 440 and generate a proximity signal based on the detection.

The sensor element 475 can provide the proximity signal to the proximity sensor 470. As shown in FIG. 4, the sensor element 475 is positioned along or near the edge of the communication device 440 and adjacent to the antenna 435. The arrangement of the sensor element 475 and/or the antenna 435 are not limited to this example arrangement.

The proximity sensor 470 can include processor circuitry that is configured to determine (e.g., detect) the proximity of one or more objects to the communication device 440 based on the proximity signal from the sensor element(s) 475. For example, the proximity sensor 470 can be configured to calculate a distance between the object(s) and the sensor element based on the proximity signal. For example, the proximity sensor 470 can use a LUT to compare a value of the proximity signal to corresponding distance with the LUT to determine the distance between the object(s) and the communication device 440. The proximity sensor 470 can provide the distance information to the baseband processor 405 for further processing as discussed below. In an aspect, the distance information can be provided to the sensor hub 465 for additional processing. For example, the sensor hub 465 can adjust, weight, average, normalize, round, and/or one or more other operations as would be understood by one of ordinary skill in the relevant arts. This sensor hub 465 can then provide the processed distance information to the baseband processor 405. The sensor hub 465 can also be configured to accept distance information and/or other environmental information for one or more additional proximity sensors 470 (and corresponding elements 475) in aspects where the communication device includes multiple proximity sensors 470 (and corresponding one or more elements 475). In this example, the sensor hub 465 can collect the various sensor related information, collectively process the information, and provide the processed information to the baseband processor 405.

The RF transceiver and frontend 410 can be configured to transmit and/or receive wireless communications conforming to one or more wireless protocols via antenna(s) 435. In an exemplary aspect, the RF transceiver and frontend 410 can measure, detect or otherwise determine the value of (or a value corresponding to the) transmit power of one or more wireless transmissions by the communication device 440. The transmit power can be the instantaneous transmit power of the communication device 440. In an exemplary aspect, the RF transceiver and frontend 410 includes a transmit power detector 420 that is configured to measure, detect or otherwise determine the transmit power of one or more wireless transmissions by the communication device 440. The RF transceiver and frontend 410 (e.g., the transmit power detector 420) can provide the determined transmit power value to the baseband processor 405 for further processing as discussed below. The RF transceiver and frontend 410 and/or the transmit power detector 420 can include processor circuitry that is configured to measure, detect or otherwise determine the value of (or a value corresponding to the) transmit power of one or more wireless transmissions by the communication device 440.

The baseband processor 405 can be configured to receive the transmit power value determined by the RF transceiver and frontend 410 (e.g., the transmit power detector 420) and the distance information determined by the proximity sensor 470 (and/or sensor hub 465). The baseband processor 405 can be configured to calculate the time average specific absorption rate (e.g., average SAR 302) based on the transmit power value from the RF transceiver and frontend 410 (e.g., the transmit power detector 420) and/or the distance information determined by the proximity sensor 470 (and/or sensor hub 465). The baseband processor 405 can also be configured to perform one or more power management operations, including adjusting (or controlling the RF transceiver and frontend 410 to adjust) the transmission power at which the communication device 440 transmits. The adjustment of the transmit power can be based on the transmit power value from the RF transceiver and frontend 410 (e.g., the transmit power detector 420) and/or the distance information determined by the proximity sensor 470 (and/or sensor hub 465).

In an exemplary aspect, the baseband processor 405 includes a SAR average calculator 415 that is configured calculate a time average specific absorption rate (e.g., average SAR 302) based on the transmit power value from the RF transceiver and frontend 410 (e.g., the transmit power detector 420) and/or the distance information determined by the proximity sensor 470 (and/or sensor hub 465). The baseband processor 405 and/or SAR average calculator 415 can include processor circuitry that is configured to calculate (or otherwise determine) a time average specific absorption rate (e.g., average SAR 302) based on the transmit power value from the RF transceiver and frontend 410 (e.g., the transmit power detector 420) and/or the distance information determined by the proximity sensor 470 (and/or sensor hub 465). The proximity sensor 470, SAR average calculator 415 and transmit power detector 420 can collectively be referred to as the transmit power controller 480.

In an exemplary aspect, the baseband processor 405 can be configured to calculate or otherwise determine a current (e.g., instantaneous) SAR value (e.g., $S_{ins}$) of the communication device 440 based on the transmit power ($P_t$) of the RF Transceiver and Frontend 410 and/or on the proximity distance (e.g., $D_t$). In an exemplary aspect, the instantaneous SAR value (e.g., $S_{ins}$) can be determined from information obtained from one or more calibration or testing operations. For example, the baseband processor 405 can access a memory that stores instantaneous SAR values (e.g., $S_{ins}$) having corresponding transmit power ($P_t$) and/or proximity distance (e.g., $D_t$) values. For example, the baseband processor 405 can access a LUT and determine the instantaneous SAR value (e.g., $S_{ins}$) based on the transmit power ($P_t$) and/or proximity distance (e.g., $D_t$) values.

Figure 6:
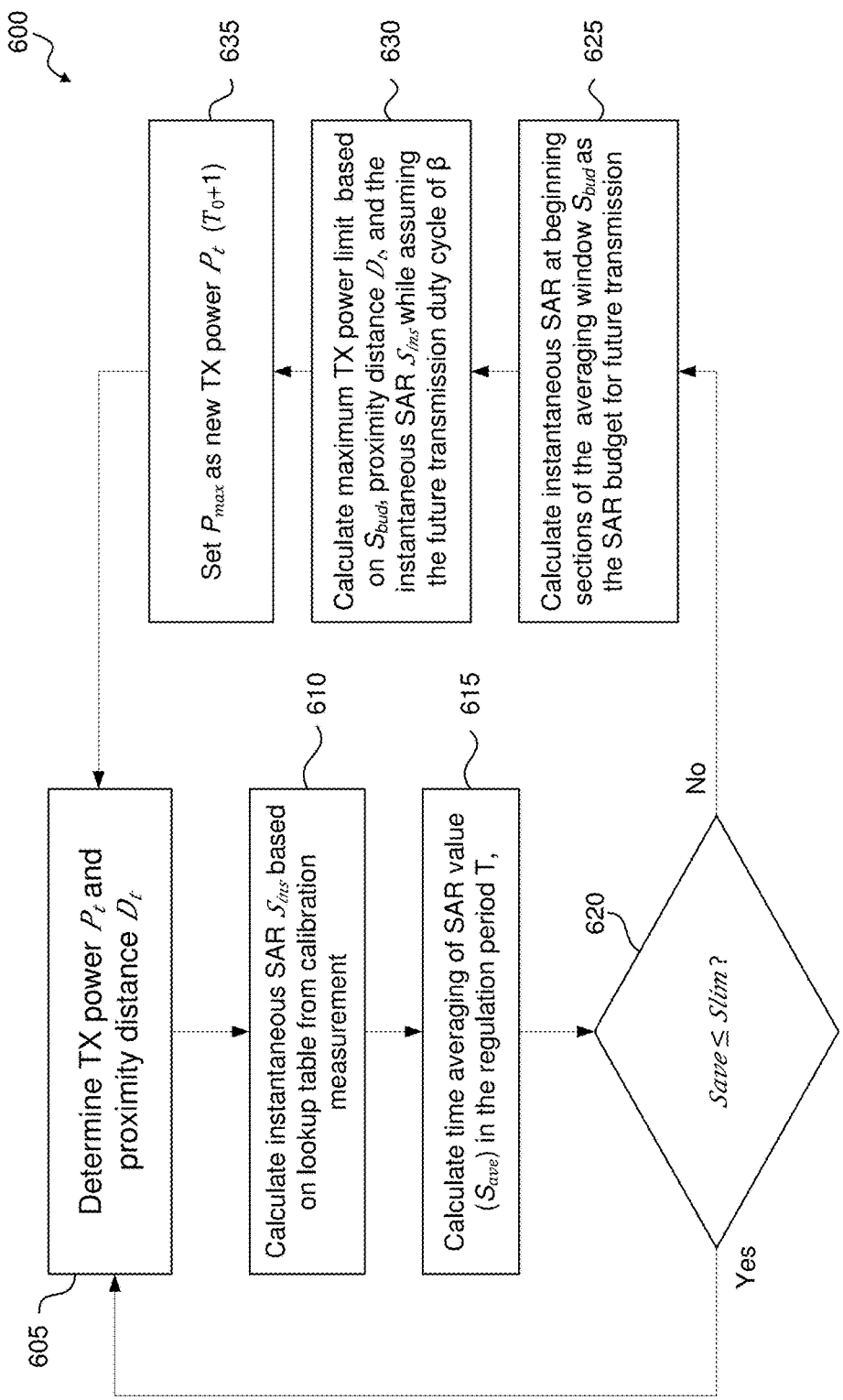
FIG. 6 illustrates a transmission power control method according to an exemplary aspect of the present disclosure.

FIG. 6 illustrates a transmission power control method according to an exemplary aspect of the present disclosure. The flowchart is described with continued reference to FIGS. 1-5 and with reference to FIGS. 7A-9C. The operations of the method are not limited to the order described below, and the various operations may be performed in a different order. Further, two or more operations of the method may be performed simultaneously with each other.

The method of flowchart 600 begins at operation 605, where transmit (TX) power $P_t$ and proximity distance $D_t$ are determined. The proximity distance $D_t$ can include proximity information corresponding to the detected distance in addition to (or in place of) the detected distance.

In an exemplary aspect, the proximity sensor 270 can detect the proximity of one or more objects (e.g., $D_t$) to the communication device 140. For example, the proximity sensor 270 can detect the distance the communication device 140 is to an object (e.g., user of the communication device 140) and to generate proximity information corresponding to the detected distance. In an exemplary aspect, the proximity sensor 270 can be configured to calculate a proximity distance that corresponds to the distance between the communication device 140 and one or more objects (e.g., the user of the communication device 140). In other aspects, the controller 240 can calculate the proximity distance based on proximity information provided to the controller 240 by the proximity sensor 270.

The transceiver 200 can be configured to calculate or otherwise determine the transmit power ($P_t$) the transceiver 200 is wireless transmitting at. The transceiver 200 can provide the determined transmit power ($P_t$) to the controller 240. The transceiver 200 can alternatively determine transmission information, such as, for example, wireless channel information, the radio access technology (RAT) being used, the modulation and coding scheme, and/or one or more other parameters as would be understood by those skilled in the art. The transmission information can then be provided to the controller 240 and the controller 240 can be configured to determine the transmit power ($P_t$) based on the transmission information.

In an exemplary aspect, the proximity sensor 470 can determine (e.g., detect) the proximity of one or more objects (e.g., $D_t$) to the communication device 440 based on the proximity signal from the sensor element(s) 475.

The RF transceiver and frontend 410 can be configured to transmit and/or receive wireless communications conforming to one or more wireless protocols via antenna(s) 435. In an exemplary aspect, the RF transceiver and frontend 410 can measure, detect or otherwise determine the value of (or a value corresponding to the) transmit power ($P_t$) of one or more wireless transmissions by the communication device 440. In an exemplary aspect, the RF transceiver and frontend 410 includes a transmit power detector 420 that is configured to measure, detect or otherwise determine the transmit power ($P_t$) of one or more wireless transmissions by the communication device 440.

After operation 605, the flowchart 600 transitions to operation 610, where the current (e.g., instantaneous) SAR value (e.g., $S_{ins}$) of the communication device is determined. The instantaneous SAR value (e.g., $S_{ins}$) can be determined based on the transmit power ($P_t$) of the transceiver 200 and/or on the proximity distance (e.g., $D_t$). In an exemplary aspect, the instantaneous SAR value (e.g., $S_{ins}$) can be determined from information obtained from one or more calibration or testing operations. For example, the controller 240 can access a memory that stores instantaneous SAR values (e.g., $S_{ins}$) having corresponding transmit power ($P_t$) and/or proximity distance (e.g., $D_t$) values. In this example, the controller 240 can access a LUT and determine the instantaneous SAR value (e.g., $S_{ins}$) based on the transmit power ($P_t$) and/or proximity distance (e.g., $D_t$) values. In an exemplary aspect, the baseband processor 405 can be configured to calculate or otherwise determine the instantaneous SAR value (e.g., $S_{ins}$) of the communication device 440 based on the transmit power ($P_t$) of the RF Transceiver and Frontend 410 and/or on the proximity distance (e.g., $D_t$).

After operation 610, the flowchart 600 transitions to operation 615, where an average SAR value is determined. In an exemplary aspect, the average SAR value is a moving/time average. The average SAR value can be calculated based on the instantaneous SAR value (e.g., $S_{ins}$) of the communication device.

In an exemplary aspect, the average SAR value ($S_{ave}$) is calculated over a regulation period T based on the following equation:

$$S_{ave} = \frac{1}{T} \int_{T_0-T}^{T_0} S_{ins} dt$$

where T is the regulation period, $T_o$ is the current point in time (e.g., the end of the sampling window), and $S_{ins}$ is the instantaneous SAR value.

In an exemplary aspect, the controller 240 can be configured to calculate the average SAR value (i.e., a time average specific absorption rate) based on the instantaneous SAR value (e.g., $S_{ins}$) over a sampling window.

In an exemplary aspect, the baseband processor 405 can be configured to calculate the time average specific absorption rate (e.g., average SAR 302) based on the transmit power value from the RF transceiver and frontend 410 (e.g., the transmit power detector 420) and/or the distance information determined by the proximity sensor 470 (and/or sensor hub 465). That is, the baseband processor 405 can be configured to calculate the average SAR value based on the instantaneous SAR value (e.g., $S_{ins}$), which is calculated based on the transmit power ($P_t$) of the transceiver 200 and/or on the proximity distance (e.g., $D_t$). In an exemplary aspect, the baseband processor 405 includes a SAR average calculator 415 that is configured calculate a time average specific absorption rate (e.g., average SAR 302).

After operation 615, the flowchart 600 transitions to operation 620, where the average SAR value ($S_{ave}$) is compared with a time average specific absorption rate threshold value ($S_{lim}$). In an exemplary aspect, the time average specific absorption rate threshold value ($S_{lim}$) is a predetermined value that is set based on one or more regulatory compliance limits (e.g., FCC SAR limit). In an exemplary aspect, the time average specific absorption rate threshold value ($S_{lim}$) can be a threshold value that is less than or equal to a maximum specific absorption rate over a predetermined time period. For example, the time average specific absorption rate threshold value ($S_{lim}$) can be a threshold value that is less than or equal to the maximum allowable SAR value over, for example, a 6 minute time period, but is not limited thereto.

In an exemplary aspect, the controller 240 can be configured to compare the time average specific absorption rate threshold value ($S_{lim}$) with the average SAR value ($S_{ave}$) to determine if the average SAR value ($S_{ave}$) is less than or equal to the time average specific absorption rate threshold value ($S_{lim}$) (e.g., $S_{ave} \leq S_{lim}$). In an exemplary aspect, the baseband processor 405 can be configured to compare the time average specific absorption rate threshold value ($S_{lim}$) with the average SAR value ($S_{ave}$) to make the determination.

If the average SAR value ($S_{ave}$) is less than or equal to the time average specific absorption rate threshold value ($S_{lim}$) (YES at operation 620), the flowchart 600 returns to operation 605, where new values of the transmit (TX) power $P_t$ and proximity distance $D_t$ are determined, and operations 610-620 are repeated.

If the average SAR value ($S_{ave}$) greater than the time average specific absorption rate threshold value ($S_{lim}$) (NO at operation 620), the flowchart 600 transitions to operation 625. At operation 625, the power absorption budget ($S_{bud}$) is determined. In an exemplary aspect, the power absorption budget ($S_{bud}$) is determined based on the comparison of the average SAR value ($S_{ave}$) and the time average specific absorption rate threshold value ($S_{lim}$).

In an exemplary aspect, the specific absorption budget ($S_{bud}$) is the instantaneous SAR value ($S_{ins}$) over a portion or all of the sampling window. The power absorption budget ($S_{bud}$) corresponds to the specific absorption rate over a portion of the sampling window that can be used as the available specific absorption rate for a next transmission (e.g., the budget for the SAR that can be used for a next transmission).

In an exemplary aspect, the power absorption budget ($S_{bud}$) is calculated over a portion or all of the sampling window (i.e., the regulation period), and satisfies the following equation:

$$S_{bud} = \frac{1}{(1-\alpha)T} \int_{T_0-T}^{T_0-\alpha T} S_{ins} dt$$

where T is the regulation period, $T_o$ is the current point in time (e.g., the end of the sampling window), $S_{ins}$ is the instantaneous SAR value, and α is sampling window factor. The sampling window factor α has a value such that 0≤α<1. In this example, the portion of the sampling window is defined as (1−α)T.

After operation 625, the flowchart 600 transitions to operation 630, where a transmission power threshold value (e.g., a maximum transmission (TX) power value $P_{max}$) is determined. In an exemplary aspect, the transmission power threshold value is calculated based on the power absorption budget ($S_{bud}$), the proximity distance $D_t$, the instantaneous SAR value (e.g., $S_{ins}$), and/or a future transmission duty cycle factor (β). For example, the transmission power threshold value can be determined such that the transmission power threshold value at the current proximity distance $D_t$ produces an instantaneous SAR value (e.g., $S_{ins}$) that is less than or equal to the power absorption budget ($S_{bud}$). In one or more exemplary aspects, the transmission power threshold value is determined such that the product of the future transmission duty cycle factor ($\beta$) and the instantaneous SAR value (e.g., $S_{ins}$) resulting from the transmission power threshold value at the current proximity distance $D_t$ is less than or equal to the power absorption budget ($S_{bud}$).

In an exemplary aspect, the future transmission duty cycle factor ($\beta$) is the prediction of the future transmission duty cycle, and can have a value such that $0 \le \beta \le 1$. For example, if $\beta=1$, it is assumed that the communication device 140 is transmitting continuously over the next duty cycle. Conversely, if $\beta=0$, it is assumed that the communication device 140 is not transmitting at all over the next duty cycle.

In an exemplary aspect, the transmission power threshold value (e.g., $P_{max}$) is calculated such that the following equation is satisfied:

$$\beta \cdot S_{ins}(D_t, P_{max}(T_0+1)) \le S_{bud}$$

where $T_o$ is the current point in time (e.g., the end of the sampling window), $S_{ins}$ is the instantaneous SAR value, $S_{bud}$ is the power absorption budget, and $D_t$ is the proximity distance.

In an exemplary aspect, the controller 240 can be configured to calculate the transmission power threshold value based on the power absorption budget ($S_{bud}$), the proximity distance $D_t$, the instantaneous SAR value (e.g., $S_{ins}$), and/or a future transmission duty cycle factor ($\beta$). In an exemplary aspect, the baseband processor 405 can be configured to calculate the transmission power threshold value based on the power absorption budget ($S_{bud}$), the proximity distance $D_t$, the instantaneous SAR value (e.g., $S_{ins}$), and/or a future transmission duty cycle factor ($\beta$).

In an exemplary operation, the determination of the transmission power threshold value can be used to throttle the transmit power ($P_t$) of the communication device 140. For example, the next transmit power $P_t$ at time $T_o+1$ can be set to the transmission power threshold value $P_{max}$. In an exemplary aspect, the transmit power satisfies the following equation:

$$P_t(T_0+1) = P_{max}(T_0+1)$$

where $T_o$ is the current point in time, $P_t$ is the transmit power of the communication device, and $P_{max}$ is the transmission power threshold value By throttling the next transmit power $P_t$ to the transmission power threshold value $P_{max}$, the resulting instantaneous SAR value $S_{ins}$ is set such that the resulting average SAR value ($S_{ave}$) over the estimated transmission duty cycle of the communication device (i.e., the future transmission duty cycle factor ($\beta$)) is less than are equal to the time average specific absorption rate threshold value ($S_{lim}$). As a result, the average SAR value ($S_{ave}$) (e.g., 302 in FIG. 3) of the communication device 140 is maintained so as to comply with one or more regulatory thresholds while allowing for the transmit power of the communication to exceed a transmission power threshold value (e.g., 315 in FIG. 3). That is, the communication device 140 is allowed to transmit at a transmit power that would result in a corresponding instantaneous SAR value that would exceed a regulatory SAR limit as along as the average SAR value ($S_{ave}$) remains at or below the regulator SAR limit. This operation is illustrated in FIGS. 7A-9C.

After operation 635, the flowchart 600 returns to operation 605, where the next transmit power $P_t$ is set to the transmission power threshold value $P_{max}$ and operations 605 to 620 can be repeated.

FIGS. 7A-7C illustrate a plot 702 of a time average SAR 725 resulting from an instantaneous SAR 720 and with respect to a regulatory SAR limit 730. The proximity distance 705 of the communication device is illustrated in plot 700. In this example, the proximity distance 705 is constant. In an exemplary aspect, the proximity distance 705 maintains a worst case distance value (e.g., in close proximity to the user). In an exemplary aspect, the transmission power control is configured with the sampling window factor ($\alpha$) having a value equal to or approaching 1 and the future transmission duty cycle factor ($\beta$) having a value of 1 for the power absorption budget ($S_{bud}$) calculation. Given these values, the communication device operates using an aggressive transmission control which results in an aggressive throttling of the transmitting power to comply with the regulatory limit 730 (e.g., 1.6. W/Kg)

As shown in plot 701, the transmit power ($P_t$) 710 is illustrated with respect to the transmission power threshold value (e.g., $P_{max}$) 715. In this example, the transmit power 710 reflects the periods of transmission by the communication device. For example, the communication device transmit using a transmit power 710 that is at a maximum transmit power (i.e., transmission power threshold value ($P_{max}$) 715). From time 0 to approximately 190 seconds, the average SAR 725 increases to the regulatory limit 730 due to the instantaneous SAR 720 excessing the regulatory limit 730. At approximately 190 seconds, transmission is halted so that the average SAR 725 does not exceed the regulatory limit 730. The transmission is again halted from approximately 900 to 1100 seconds and illustrated by the maximum transmit power (i.e., transmission power threshold value ($P_{max}$) 715) being set to zero. In contrast, the non-transmission from approximately 500-700 seconds is due to the communication not having a transmission scheduled during this time, but would be allowed to transmit based on the maximum transmit power (i.e., transmission power threshold value ($P_{max}$) 715) having a value of about 100 mW during this period.

In this example, although the communication device is allowed to transmit at a transmit power that results in an instantaneous SAR value 720 above the regulatory limit 730, such operation requires that the communication device cease transmission operations at a later time so that the average SAR is maintained at or below the regulatory limit 730.

FIGS. 8A-8C illustrate a plot 802 of a time average SAR 825 resulting from an instantaneous SAR 820 at a proximity distance 805 (plot 800) and with respect to a regulatory SAR limit 830. The proximity distance ($D_t$) 805 of the communication device is illustrated in plot 800.

In an exemplary aspect, the transmission power control is configured with the sampling window factor ($\alpha$) having a value equal to or approaching 1 and the future transmission duty cycle factor ($\beta$) having a value of 1 for the power absorption budget ($S_{bud}$) calculation. Given these values, the communication device operates using an aggressive transmission control which results in an aggressive throttling of the transmitting power to comply with the regulatory limit 830 (e.g., 1.6. W/Kg). However, the throttling is less severe when compared to the aspects illustrated in FIGS. 7A-7C due to the varying proximity distance ($D_t$) 805.

During the idle period of transmission (between 500s-700s), the time average SAR 825 drops gradually, which allows transmission to starts at maximum power immediately after the idle period despite a close proximity between a user and the communication device (e.g., body to antenna proximity). With an increase in proximity distance $D_t$ (e.g., at 200 seconds), the head room increases in time averaged SAR 825 such that a higher transmit power 810 can be maintained. As is shown, when the proximity distance $D_t$ decreases, (e.g., at 400 seconds), the transmission power threshold value ($P_{max}$) 815 is reduced. That is, by taking the proximity distance $D_t$ into account, the throttling of transmit power 810 is reduced compared to the operations illustrated in FIGS. 7A-7C while keeping the system in SAR compliance.

In an exemplary aspect, the aggressive parameter settings (e.g., $\alpha=\beta=1$), the future SAR limit (e.g., the power absorption budget ($S_{bud}$)) is heavily dependent on the instantaneous SAR value 820 at the beginning of the sampling window and that is about to exit the window. As shown in FIG. 8C, this may result in the transmission being halted such as at approximately 300 and 950 seconds.

FIGS. 9A-9C illustrate a plot 902 of a time average SAR 925 resulting from an instantaneous SAR 920 at a proximity distance 905 (plot 900) and with respect to a regulatory SAR limit 930. The proximity distance ($D_t$) 905 of the communication device is illustrated in plot 900. These plots are similar to the plots illustrated in FIGS. 8A-8C, but the transmission power control is configured with the sampling window factor ($\alpha$) having a value equal to 0.5 and the future transmission duty cycle factor ($\beta$) having a value of 0.5 for the power absorption budget ($S_{bud}$) calculation. Given these values, the communication device operates using a more conservative transmission control which reduces the throttling of the transmitting power that is needed to comply with the regulatory limit 930 (e.g., 1.6. W/Kg).

In an exemplary aspect, the time average specific absorption rate threshold value ($S_{lim}$) can be set at a value less than the regulatory limit 930 to provide a more conservative transmission control operation to further reduce the throttling (e.g., halting of transmissions) of the transmitting power to comply with the regulatory limit 930. For example, the time average specific absorption rate threshold value ($S_{lim}$) can have a value of 1.4 W/Kg while the regulatory limit 930 has a limit of, for example, 1.6. W/Kg.

With the sampling window factor ($\alpha$) having a value equal to 0.5 for the SAR budget (i.e., power absorption budget ($S_{bud}$)) calculation, the first half of the sampling window (e.g., 3 minutes of the 6 minutes time averaging window) is used to calculate the budget for future SAR. To opportunistically increase the transmit power, the future transmission duty cycle assumption is 50% (i.e. $\beta=0.5$). Under these conditions, the throttling (i.e., halting) of transmission can be more successfully avoided while offering a higher average transmit power over time. In this example, the 6 minutes average SAR at times may exceed the time average specific absorption rate threshold value ($S_{lim}$) of 1.4 W/Kg due to the selection of $\alpha$ and $\beta$, but does not exceed the regulatory limit 930.

In one or more exemplary aspects, optimizations and combinations of the parameters (e.g., $\alpha$, $\beta$, $S_{lim}$) can be used based on, for example, device application and statistical usage data. For example, communication devices that are used for voice traffic and data stacking may have only a limited need for continuous transmissions that are for more than a few minutes. In this case, more aggressive parameters settings (e.g., $\alpha$ and $\beta$ being closer to 1) can be used as shown in FIGS. 8A-8C to provide an increase in performance with minimum transmission interruption. For communication devices in which frequent and continuous upload data traffic is expected, more balanced parameter settings can be used as in FIGS. 9A-9C to provide a more stable transmission operation.

Examples

Example 1 is a transmission power control method for a communication device, comprising: calculating a specific absorption rate (SAR) based on a transmission power of the communication device; calculating a time average specific absorption rate based on the SAR; calculating a power absorption budget value based on the time average specific absorption rate and a time average specific absorption rate threshold value; and adjusting the transmission power of the communication device based on the power absorption budget value.

In Example 2, the subject matter of Example 1, further comprising: calculating a transmission power threshold value based on the power absorption budget value, wherein adjusting the transmission power of the communication device is based on the transmission power threshold value.

In Example 3, the subject matter of Example 2, wherein calculating the transmission power threshold value is further based on an anticipated future transmission duty cycle of the communication device.

In Example 4, the subject matter of Example 3, wherein calculating the transmission power threshold value is further based on a proximity distance of the communication device with an external object.

In Example 5, the subject matter of Example 2, wherein the transmission power threshold value is a maximum transmission power at which the communication device transmits.

In Example 6, the subject matter of Example 1, further comprising: calculating, using a proximity sensor, a proximity distance of the communication device with an external object.

In Example 7, the subject matter of Example 6, wherein calculating the SAR is further based on the proximity distance of the communication device with the external object.

In Example 8, the subject matter of Example 6, wherein the proximity sensor is a capacitance sensor configured to measure a capacitance, wherein the proximity distance of the communication device with the external object is calculated based on the measured capacitance.

In Example 9, the subject matter of Example 1, wherein the time average specific absorption rate is a time domain moving average of the SAR within a sampling window.

In Example 10, the subject matter of Example 9, wherein the power absorption budget value is calculated based on an instantaneous specific absorption rate value over a portion of the sampling window.

In Example 11, the subject matter of Example 9, wherein the time average specific absorption rate threshold value is less than or equal to a maximum specific absorption rate over the sampling window.

In Example 12, the subject matter of Example 1, further comprising: comparing the time average specific absorption rate and the time average specific absorption rate threshold value, wherein the power absorption budget value is calculated based on the comparison.

Example 13 is a communication device, comprising: a transceiver configured to wirelessly communicate using one or more communication protocols; and a controller configured to: calculate a specific absorption rate (SAR) based on a transmission power of the communication device; calculate a time average specific absorption rate based on the SAR; calculate a power absorption budget value based on the time average specific absorption rate and a time average specific absorption rate threshold value; and adjust the transmission power of the communication device based on the power absorption budget value.

In Example 14, the subject matter of Example 13, wherein the controller is further configured to: calculate a transmission power threshold value based on the power absorption budget value, wherein adjusting the transmission power of the communication device is based on the transmission power threshold value.

In Example 15, the subject matter of Example 14, wherein calculating the transmission power threshold value is further based on an anticipated future transmission duty cycle of the communication device.

In Example 16, the subject matter of Example 15, wherein calculating the transmission power threshold value is further based on a proximity distance of the communication device with an external object.

In Example 17, the subject matter of Example 14, wherein the transmission power threshold value is a maximum transmission power at which the communication device transmits.

In Example 18, the subject matter of Example 13, further comprising a proximity sensor that is configured to determine a proximity distance of the communication device with an external object.

In Example 19, the subject matter of Example 18, wherein the controller is configured to calculate the SAR based on the proximity distance of the communication device with the external object.

In Example 20, the subject matter of Example 18, wherein the proximity sensor is a capacitance sensor configured to measure a capacitance, wherein the proximity distance of the communication device with the external object is calculated based on the measured capacitance.

In Example 21, the subject matter of any of Examples 13-20, wherein the time average specific absorption rate is a time domain moving average of the SAR within a sampling window.

In Example 22, the subject matter of Example 21, wherein the power absorption budget value is calculated based on an instantaneous specific absorption rate value over a portion of the sampling window.

In Example 23, the subject matter of Example 13, wherein the controller is further configured to: compare the time average specific absorption rate and the time average specific absorption rate threshold value; and calculate the power absorption budget value based on the comparison.

Example 24 is a transmission power control method for a communication device, comprising: calculating a specific absorption rate (SAR) based on a transmission power of the communication device; calculating a power absorption budget value based on the SAR over at least a portion of a sampling window; calculating a transmission power threshold value based on the power absorption budget value and the SAR; and adjusting the transmission power of the communication device based on the transmission power threshold value.

In Example 25, the subject matter of Example 24, wherein: calculating the transmission power threshold value is further based on a proximity distance of the communication device with an external object; and calculating the SAR is further based on the proximity distance.

In Example 26, the subject matter of any of Examples 1-12, further comprising: calculating, using a proximity sensor, a proximity distance of the communication device with an external object.

In Example 27, the subject matter of Example 26, wherein calculating the SAR is further based on the proximity distance of the communication device with the external object.

In Example 28, the subject matter of Example 26, wherein the proximity sensor is a capacitance sensor configured to measure a capacitance, wherein the proximity distance of the communication device with the external object is calculated based on the measured capacitance.

In Example 29, the subject matter of any of Examples 1-12, wherein the time average specific absorption rate is a time domain moving average of the SAR within a sampling window.

In Example 30, the subject matter of Example 29, wherein the power absorption budget value is calculated based on an instantaneous specific absorption rate value over a portion of the sampling window.

In Example 31, the subject matter of Example 29, wherein the time average specific absorption rate threshold value is less than or equal to a maximum specific absorption rate over the sampling window.

In Example 32, the subject matter of any of Examples 1-12, further comprising: comparing the time average specific absorption rate and the time average specific absorption rate threshold value, wherein the power absorption budget value is calculated based on the comparison.

Example 33 is an apparatus comprising means to perform the method as described in any of Examples 1-12.

Example 34 is a communication device comprising means to perform the method as described in any of Examples 1-12.

Example 35 is Processor circuitry operable in a communication device, the processor circuitry being configured to perform the method as described in any of Examples 1-12.

Example 36 is a computer program product embodied on a computer-readable medium comprising program instructions, when executed, causes a processor to perform the method of any of Examples 1-12.

Example 37 is an apparatus substantially as shown and described.

Example 38 is a method substantially as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

As will be apparent to a person of ordinary skill in the art based on the teachings herein, exemplary aspects are not limited to Long-Term Evolution (LTE), and can be applied to other cellular communication standards, including (but not limited to) Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), and Worldwide Interoperability for Microwave Access (WiMAX) (Institute of Electrical and Electronics Engineers (IEEE) 802.16) to provide some examples. Further, exemplary aspects are not limited to cellular communication networks and can be used or implemented in other kinds of wireless communication access networks, including (but not limited to) one or more IEEE 802.11 protocols, Bluetooth, Near-field Communication (NFC) (ISO/IEC 18092), ZigBee (IEEE 802.15.4), and/or Radio-frequency identification (RFID), to provide some examples. Further, exemplary aspects are not limited to the above wireless networks and can be used or implemented in one or more wired networks using one or more well-known wired specifications and/or protocols.

What is claimed is:

1. A transmission power control method for a communication device, comprising:
    calculating a specific absorption rate (SAR) based on a transmission power of the communication device;
    calculating a time average SAR over a sampling window based on the SAR;
    calculating a power absorption budget value based on the time average SAR and a time average SAR threshold value, the power absorption budget value being a proportion of the SAR that is cumulatively measured over at least a portion of the sampling window starting at a point within the sampling window that is defined by a sampling window factor; and
    adjusting the transmission power of the communication device based on the power absorption budget value.

2. The transmission power control method of claim 1, further comprising:
    calculating a transmission power threshold value based on the power absorption budget value,
    wherein adjusting the transmission power of the communication device is based on the transmission power threshold value.

3. The transmission power control method of claim 2, wherein calculating the transmission power threshold value is further based on an anticipated future transmission duty cycle of the communication device.

4. The transmission power control method of claim 3, wherein calculating the transmission power threshold value is further based on a distance between the communication device and an external object.

5. The transmission power control method of claim 2, wherein the transmission power threshold value is a maximum transmission power at which the communication device transmits.

6. The transmission power control method of claim 1, further comprising:
    calculating, using a proximity sensor, a distance between the communication device and an external object.

7. The transmission power control method of claim 6, wherein calculating the SAR is further based on the distance between the communication device and the external object.

8. The transmission power control method of claim 6, wherein the proximity sensor is a capacitance sensor configured to measure a capacitance, and
    wherein the distance between the communication device and the external object is calculated based on the measured capacitance.

9. The transmission power control method of claim 1, wherein the time average SAR is a time domain moving average of the SAR within a sampling window.

10. The transmission power control method of claim 9, wherein the power absorption budget value is calculated based on an instantaneous SAR value that is calculated over a portion of the sampling window.

11. The transmission power control method of claim 9, wherein the time average SAR threshold value is less than or equal to a maximum SAR over the sampling window.

12. The transmission power control method of claim 1, further comprising:
comparing the time average SAR and the time average SAR threshold value, and
wherein the power absorption budget value is calculated based on the comparison.

13. A communication device, comprising:
a transceiver configured to wirelessly communicate using one or more communication protocols; and
a controller configured to:
calculate a specific absorption rate (SAR) based on a transmission power of the communication device;
calculate a time average SAR based on the SAR;
calculate a power absorption budget value based on the time average SAR and a time average SAR threshold value, the power absorption budget value being a proportion of the SAR that is cumulatively measured over at least a portion of the sampling window starting at a point within the sampling window that is defined by a sampling window factor; and
adjust the transmission power of the communication device based on the power absorption budget value.

14. The communication device of claim 13, wherein the controller is further configured to:
calculate a transmission power threshold value based on the power absorption budget value,
wherein adjusting the transmission power of the communication device is based on the transmission power threshold value.

15. The communication device of claim 14, wherein calculating the transmission power threshold value is further based on an anticipated future transmission duty cycle of the communication device.

16. The communication device of claim 15, wherein calculating the transmission power threshold value is further based on a distance between the communication device and an external object.

17. The communication device of claim 14, wherein the transmission power threshold value is a maximum transmission power at which the communication device transmits.

18. The communication device of claim 13, further comprising:
a proximity sensor that is configured to determine a distance between the communication device and an external object.

19. The communication device of claim 18, wherein the controller is configured to calculate the SAR based on the distance between the communication device and the external object.

20. The communication device of claim 18, wherein the proximity sensor is a capacitance sensor configured to measure a capacitance, and
wherein the distance between the communication device and the external object is calculated based on the measured capacitance.

21. The communication device of claim 13, wherein the time average SAR is a time domain moving average of the SAR within a sampling window.

22. The communication device of claim 21, wherein the power absorption budget value is calculated based on an instantaneous SAR value over a portion of the sampling window.

23. The communication device of claim 13, wherein the controller is further configured to:
compare the time average SAR and the time average SAR threshold value; and
calculate the power absorption budget value based on the comparison.

24. A transmission power control method for a communication device, comprising:
calculating a specific absorption rate (SAR) based on a transmission power of the communication device;
calculating a power absorption budget value that is a proportion of the SAR cumulatively measured over at least a portion of a sampling window starting at a point within the sampling window that is defined by a sampling window factor;
calculating a transmission power threshold value based on the power absorption budget value and the SAR; and
adjusting the transmission power of the communication device based on the transmission power threshold value.

25. The transmission power control method of claim 24, wherein:
calculating the transmission power threshold value is further based on a distance between the communication device and an external object; and
calculating the SAR is further based on the distance.

* * * * *